United States Patent
Liu et al.

(10) Patent No.: US 8,520,848 B1
(45) Date of Patent: Aug. 27, 2013

(54) SECURE PASSWORD MANAGEMENT USING KEYBOARD LAYOUT

(75) Inventors: Kun-Hao Liu, New Taipei (TW); Lin Hung Che, New Taipei (TW); Huang Bo Ching, Zhongli (TW)

(73) Assignee: Trend Micro, Inc., Tokyo (JP)

( * ) Notice: Subject to any disclaimer, the term of this patent is extended or adjusted under 35 U.S.C. 154(b) by 170 days.

(21) Appl. No.: 13/047,504

(22) Filed: Mar. 14, 2011

(51) Int. Cl.
*G06F 7/76* (2006.01)
*H04L 15/06* (2006.01)

(52) U.S. Cl.
USPC .............................................. 380/56; 380/52

(58) Field of Classification Search
None
See application file for complete search history.

(56) References Cited

U.S. PATENT DOCUMENTS

2008/0177920 A1* 7/2008 Dennis .......................... 710/200
2009/0328199 A1* 12/2009 Gilfix et al. .................... 726/19

* cited by examiner

*Primary Examiner* — Venkat Perungavoor
(74) *Attorney, Agent, or Firm* — Beyer Law Group LLP

(57) ABSTRACT

A password management service located either on a user computer or in the cloud intercepts a user's attempt to create an account on a Web site. The user enters a sequence of a physical key combination and the service assigns a particular keyboard layout for this Web site. The service generates a password by combining the key combination with the assigned keyboard layout and returns this password to the user or to the Web site. The service stores the name of the Web site in association with the designated keyboard layout. Upon a subsequent login attempt, the service again intercepts the user's typing of the same physical key combination, generates the same password by combining the key combination with the previously assigned and stored keyboard layout, and returns the generated password to the Web site for authentication. A keyboard layout for a site may be chosen by the user, may be selected by the service, or a random layout may be generated. The service enforces a password constraint of a site by adding in the required characters, by requiring the user to choose a new key combination, or by using a different keyboard layout.

23 Claims, 8 Drawing Sheets

Keyboard with Key Combination

Keyboard with Key Combination

Key Combination on U.S. Keyboard Layout

Key Combination on Colemak Keyboard Layout

Restricted Keyboard Layout

SECURE PASSWORD MANAGEMENT USING KEYBOARD LAYOUT

FIELD OF THE INVENTION

The present invention relates generally to computer passwords. More specifically, the present invention relates to creating a strong password and remembering it more easily.

BACKGROUND OF THE INVENTION

Nowadays people use a variety of services available on the Internet ranging from community services like Facebook, Twitter and MySpace to business services such as Amazon, eBay and banking services. Each of these services generally require a user to prove their identity before accessing a Web site associated with the service; the most common way to validate a user's identity is to require a user name/password-based authentication. As more and more services become available on the Internet, and as more and more businesses require a Web-based interaction in order for a user to conduct business, users are required to memorize a greater number of passwords for all these services. And, users are generally advised to create a strong, hard-to-guess password for a banking Web site, while being allowed to generate weaker, easier-to-guess passwords for Web sites that do not hold financial or confidential user information. In order to assist users to remember each of the many passwords, there are a number of common strategies that are used.

The "one-password-for-all-services approach" means exactly that. Many users prefer using an identical user name/password pair for all the Internet services they access. The advantage of using the same password for all services is convenience, while the disadvantage is that if the password becomes known by others, a malicious agent can make use of a stolen password to log on to any Internet service on behalf of the victim and steal money or information. Another difficulty with this approach is that some Internet service providers set rules governing which passwords are acceptable. For example, some services may require users to have passwords that are longer than a designated amount of characters, some require users to include at least one digit, at least one letter, at least one other character, etc., some services restrict certain characters, and others require capital letters. So, it is generally not feasible to use the same password for all Internet services unless the password can meet the rules set by all Internet service providers used—a rare situation.

Another approach is the "write-it-down" approach, an old-fashioned approach. This is a time-honored way to help people remember something worth remembering. The user simply writes down each password associated with each Internet service and keeps this sheet of paper in a secure place (or not). This approach will not be secure if the sheet is not hidden well, is left out in the open, or is a stolen. Another risk is that if the sheet is lost (or taken) the user may not be able to log on to many Internet services because they will not remember the correct password.

The "remember-my-password" approach involves using a computer to assist. Some Internet browsers provide a function for storing a user's credentials (such as the password) in the computer. Once the user is successful at logging on to a Web site, the browser may offer to store the user's password in the browser. The next time the user would like to log on to that Web site, the browser automatically enters the stored password into the password input box on the Web page. The drawback to this approach is that if anyone else is using this computer, a malicious user can log on to any Internet service for which the password has been stored in the browser. Or, it may be possible for a sophisticated hacker to remotely retrieve any passwords stored in this fashion.

Because users are increasingly being required to provide many different passwords, and in light of the above disadvantages with the current techniques, a password management technique is desired that would not only provide for secure passwords, but also would allow a user to easily remember them without risking their loss.

SUMMARY OF THE INVENTION

To achieve the foregoing, and in accordance with the purpose of the present invention, a technique is disclosed that assists users in memorizing all of their passwords and allows for a distinct password to be used for different Internet services.

The computer system stores the name of each Web site accessed and a corresponding keyboard layout for each site. For example, if there are three sites accessed by the user, there may be three different keyboard layouts, one layout per site. The user only need remember a certain key combination and not actual passwords. This key combination then acts as a seed in conjunction with a particular keyboard layout to generate the actual password. A single key combination is sufficient to generate many passwords because a different keyboard layout may be used for each Web site. The generated password has strong security because it may be different for each Web site and because the system may enforce use of particular characters. Another advantage is that the user's password is not stored in his or her computer system.

Other benefits include being able to use this technique in a wide variety of applications that all require a user to input a password. For companies having software products that require a user to log on, this technique will increase password security. Another advantage is that use of the invention can prevent key logger software from stealing a user's password. Although the key logger software may be successful in recording the physical keys typed by user, the key logger software will be unaware of the actual password being generated because that actual password is generated using physical keys in combination with an assigned keyboard layout for a particular Web site. Thwarting of key logger software can be assured by assigning a keyboard layout that is unlikely to be the one used by a user in a particular situation.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, a goal is to provide a technique to assist users in memorizing all of their passwords and to allow for a distinct password to be used for different Internet services. The invention takes advantage of a computer keyboard, and more specifically, the layout of the keys on the keyboard. Instead of memorizing the actual password character-by-character (i.e., the specific combination of letters, numbers and characters), the user picks and remembers any combination of the physical keys on his or her computer keyboard. In other words, the user does not need to remember the specific letter or number imprinted upon the top of the key, only the location of each key on the keyboard. This sequence of remembered keys is termed a password key combination or PKC.

Keyboard Layout Examples

Figure 1:
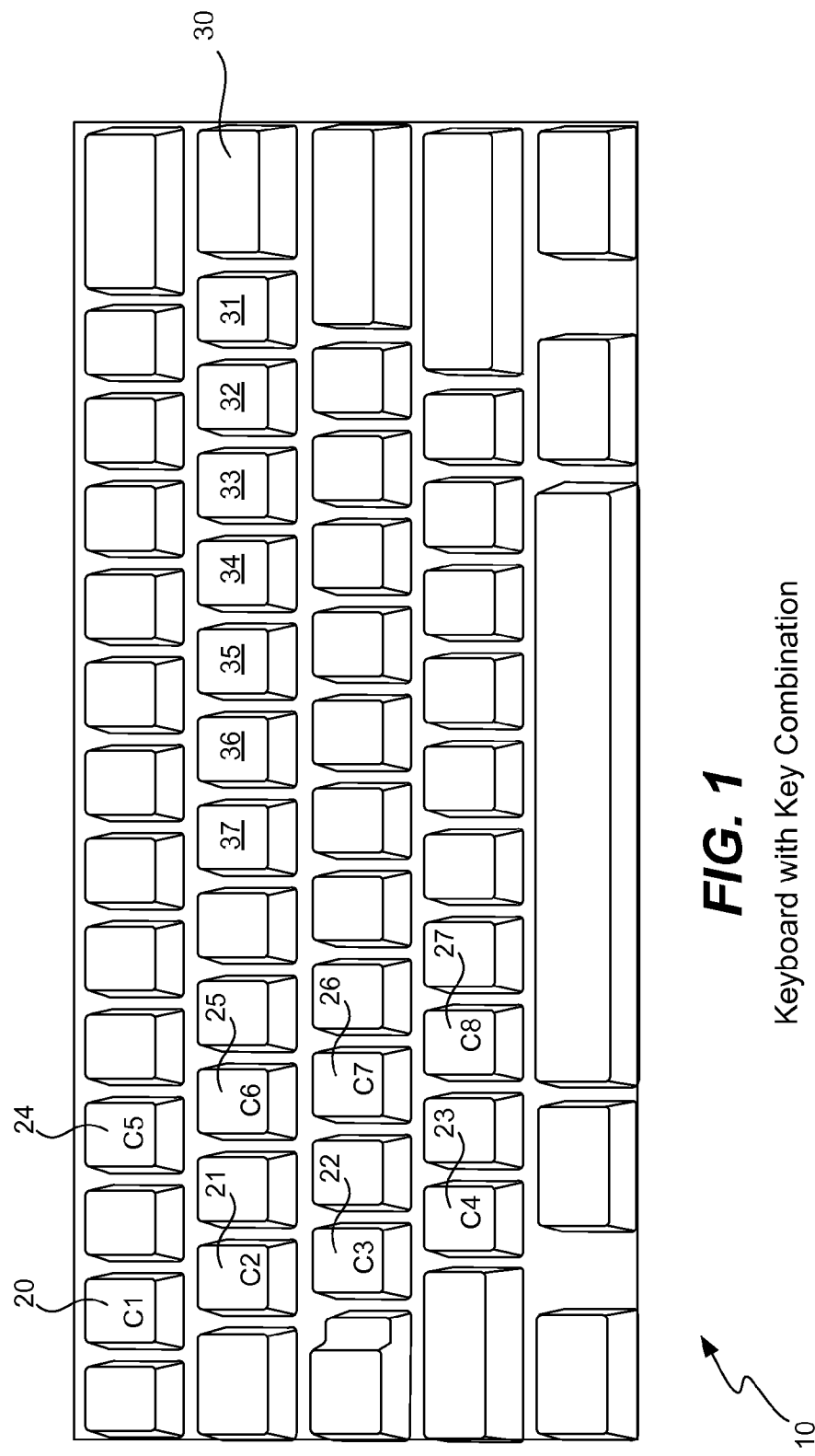
FIG. 1 shows an example keyboard having a number of physical keys.

FIG. 1 shows an example keyboard 10 having a number of physical keys. This keyboard may be a typical keyboard as shown, an ergonomic keyboard, a keyboard for any type of desktop or laptop computer, a numeric keypad (such as is often found on the right-hand side of larger keyboards), a virtual keyboard implemented in software on the touch screen of any electronic device (such as a smart phone, tablet computer, or touch screen of a computer monitor, for example), or an input keypad typically used to access a secure area.

In this example a user needs a password consisting of eight characters and he or she chooses the physical keys labeled 20-27 in that order. Thus, the user's password key combination is the keys C1-C8. So, instead of memorizing the numeral "2" as being the first character of his or her password (that numeral typically occupying the key shown at second from the left in the top row 20), the user simply memorizes "the key occupying the spot in the top row second from the left." The user then memorizes a particular sequence or pattern of keys for the rest of the password, for example, keys C2-C4 below key C1 in a diagonal line, and the keys in a diagonal line below the key C5 which is in the top row fourth from the left. Of course, other patterns of keys may also be used. In another example, the user simply memorizes the eight keys in the second row starting from the right-hand side and counting in, namely, keys 30-37. It should be noted that at this point in the process, memorized keys 20-27 (or 30-37) represent the password key combination which is simply the physical location of the keys on the keyboard; the password key combination is not assigned at this point in time to any particular characters.

In order to derive the actual password, a key-to-character mapping is used. In one embodiment of the invention, a particular keyboard layout is provided to implement the mapping. In other words, the memorized keys forming the password key combination are mapped using a suitable keyboard layout to generate the actual password.

Figure 2:
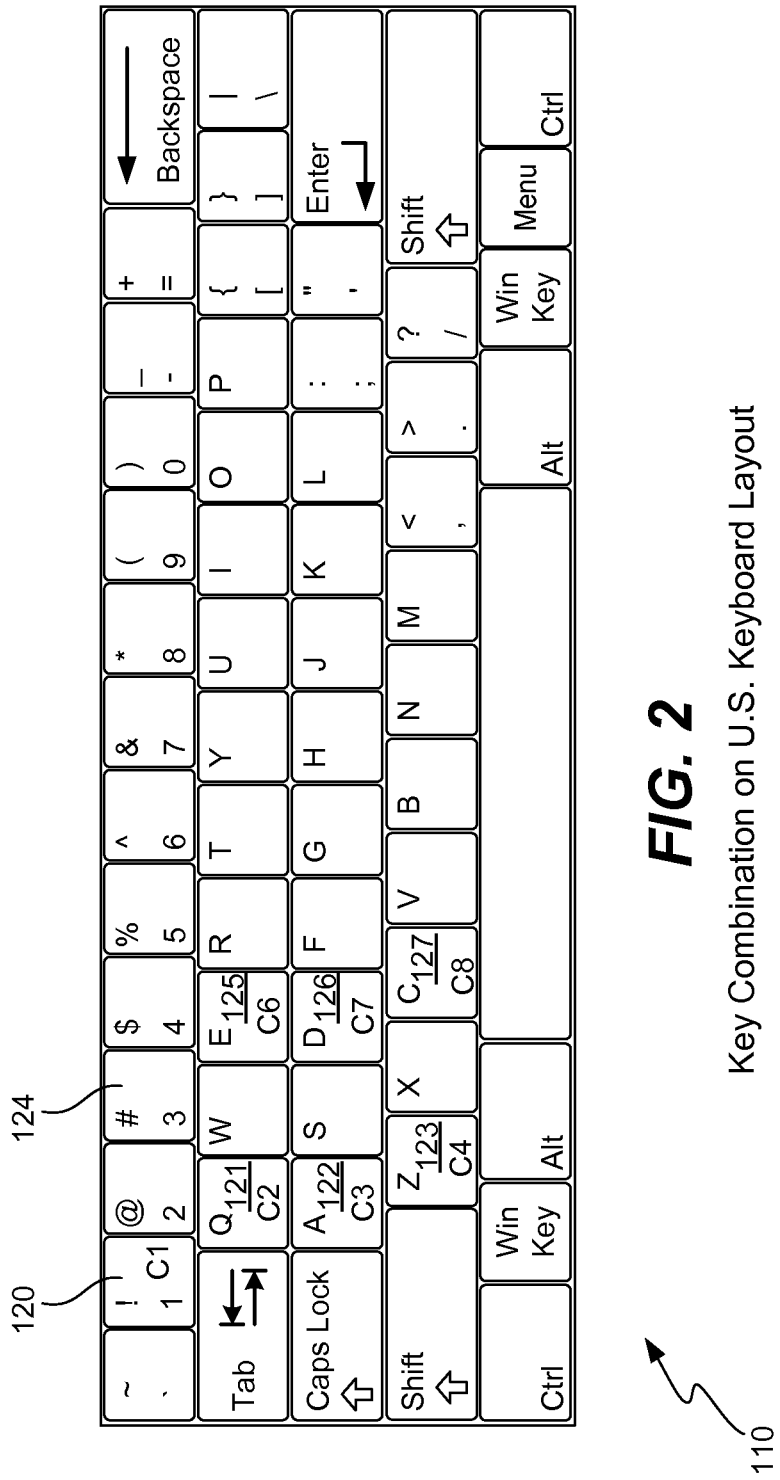
FIG. 2 illustrates a typical U.S. keyboard layout upon which the password key combination has been mapped.

FIG. 2 illustrates a typical U.S. keyboard layout upon which the password key combination has been mapped. Shown is the common keyboard layout 110 known as the "QWERTY" keyboard. By mapping the password key combination C1-C8, or rather, by mapping the physical positions of this combination to the illustrated keyboard layout we obtain the resulting characters 120-127. In other words, key C1 still occupies the top row, second from the left, and in this layout example, key C1 corresponds to the character 1. Continuing with this scheme, we obtain the eight characters: 1, Q, A, Z, 3, E, D and C. Thus, the resulting eight character password is "1QAZ3EDC" which has been obtained by applying the password key combination 20-27 to a predefined U.S. keyboard layout. Of course, other keyboard layouts may be used to which the password key combination may be applied resulting in any number of different passwords.

Figure 3:
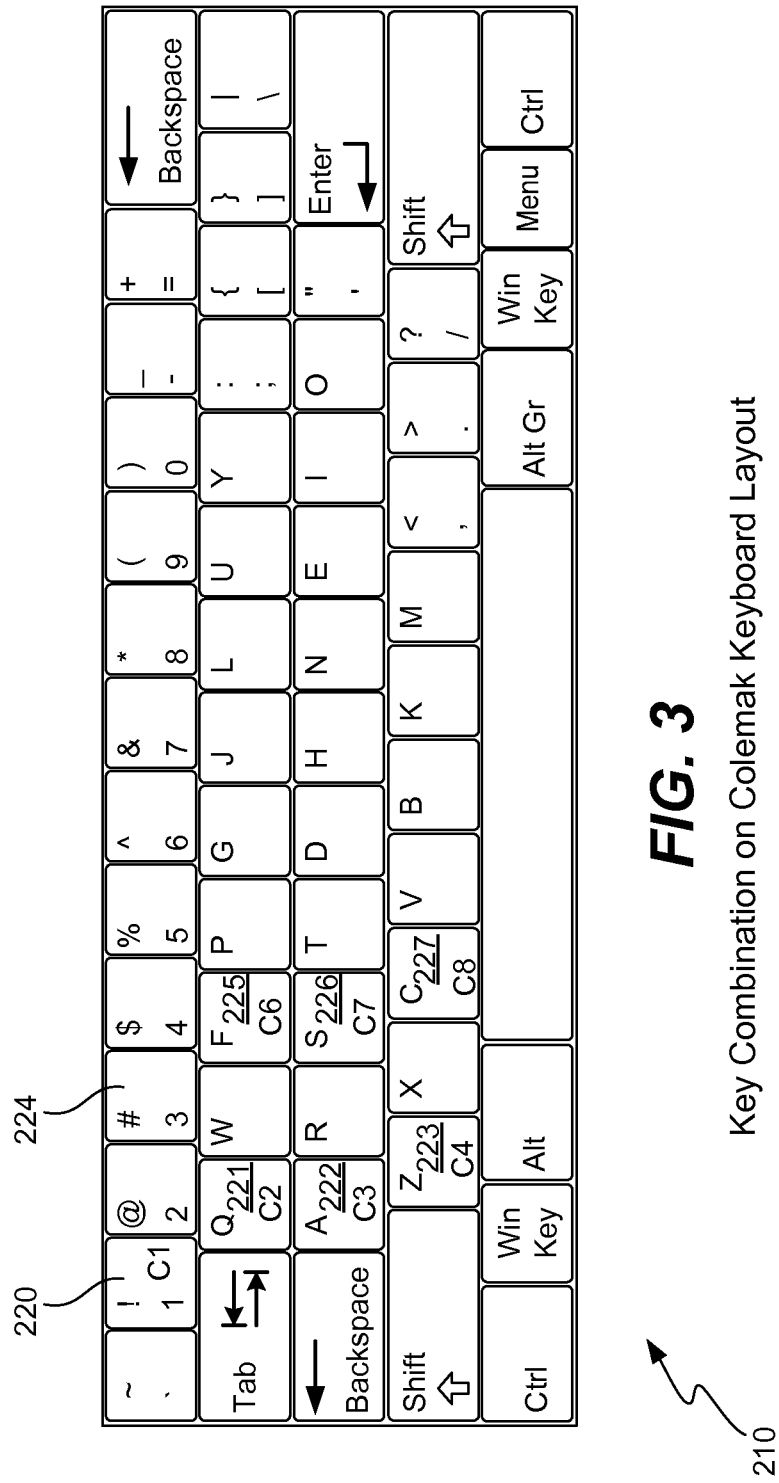
FIG. 3 illustrates a Colemak keyboard layout upon which the password key combination has been mapped.

FIG. 3 illustrates a Colemak keyboard layout upon which the password key combination has been mapped. Shown is the Colemak keyboard layout 210. By mapping the password key combination C1-C8, or rather, by mapping the physical positions of this combination to the illustrated keyboard layout we obtain the resulting characters 220-227. In other words, key C6 still occupies the second row, fourth from the left, and in this layout example, key C6 corresponds to the character F. Continuing with this scheme, we obtain the eight characters: 1, Q, A, Z, 3, F, S and C. Thus, the resulting eight character password is "1QAZ3FSC" which is different from the previous password and has been obtained by applying the password key combination 20-27 to the predefined Colemak keyboard layout.

As mentioned, other keyboard layouts may be used to which the password key combination may be applied resulting in any number of different passwords. For example, any of the foreign language variations of the QWERTY keyboard or its other variations may be used, other keyboard layouts such as Dvorak, JCUKEN, Neo, etc., and keyboard layouts for non-Latin languages may be used as well.

In fact, the invention is not limited to any standard keyboard layout or any of the actual keyboard layouts listed above. A function may be defined $$PWD = f(PKC, KL)$$

where PKC is the combination of physical key locations and KL is any type of keyboard layout. The function applies PKC to the designated keyboard layout and the password PWD is returned as a result. The function is defined such that applying the function to a particular password key combination and an assigned keyboard layout always results in the same password being generated. In this fashion, the user can be assured that using his or her memorized key combination will always results in the current password being generated for a particular Web service. The keyboard layout KL may be a random or predefined layout of characters assigned to particular keys and need not have any relation to an actual keyboard used for typing. A keyboard layout may be saved by the password management service in a graphical form such as shown in FIGS. 2 and 3, or may be saved in any suitable list, table or data structure that associates a particular key with the character or characters imprinted upon it.

To provide the user with distinct passwords for each Internet service used, one distinct keyboard layout may be used for each service. The user need only provide his or her password key combination and the password for that specific Internet service will be generated using the assigned keyboard layout. The invention uses a mechanism to store the mapping between particular Internet services and their corresponding keyboard layout. Use of the password management service will typically involve two phases: subscribing to the password management service, and logging in to a target Web site or Web service.

Flowchart Examples

Figure 4:
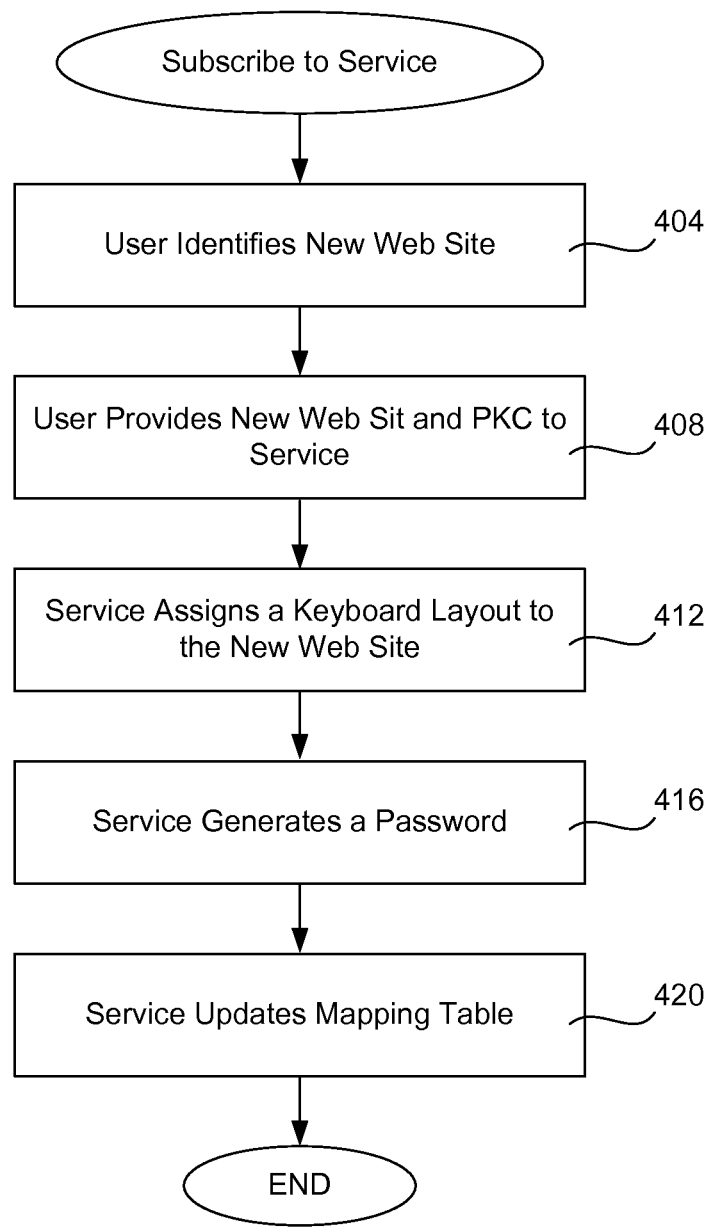
FIG. 4 is a flow diagram depicting one embodiment of subscribing to the password management service.

FIG. 4 is a flow diagram depicting one embodiment of subscribing to the password management service. In step 404 the user identifies a new target Web site to which he or she wishes to log in. Preferably, each time the user intends to sign up for a new account at a Web site he or she identifies this Web site in some fashion and alerts the password management service. The user identifies a new Web site by typing in its domain name, visiting the Web site's home page, cutting and pasting its URL, etc. Or, we provide a browser plug-in for when the user would like to subscribe to the password management service for a new Web site. The user only needs to click a button (e.g., "Add to password management service") on browser user interface.

In step 408 the user provides this target Web site and his or her preferred password key combination to the password management service. The user may contact the password management service by explicitly opening an application of the password management service on his or her computer (whether the password management service executes directly on the computer or whether the service executes an agent on the computer), by sending an e-mail message to the service, by contacting a Web site associated with the service, or in some similar fashion. The user provides the name of the target Web site and the password key combination to use with that site. As explained below in step 332 the user may also request that the service use a different keyboard layout for each site, use the same keyboard layout for each site, or use a random keyboard layout for each site. The user provides the password key combination by indicating which keys are to be used (e.g., "1QAZ3EDC"), by interacting with a graphical keyboard layout when using the password management service, or by typing the physical keys when prompted to by the service.

There are other ways that the user provides the PKC to the service. One user-friendly way to acquire a user's PKC is to integrate the service into the user's sign up process for a new Web site. The service will know that the user is going to sign up for a new Web site (this can be achieved by parsing the HTML source of the Web site's signup page). The service also has a built-in database for various popular Web sites such as Facebook, Twitter, etc. Once the service knows that the user is signing up to a new Web site, the service acquires the PKC from the "password" field of sign up page. Note that this captured PKC will not be submitted directly to the Web site for the purpose of user registration. The PKC will be transformed to an actual password which is generated by the password management service as described below.

In general, the user provides the target Web site and his or her key combination either manually or automatically. In a manual mode, the user executes the password management service (either remotely or using a local agent) and manually types in the Web site name and then his chosen password key combination. The user may optionally choose a keyboard layout for this Web site or have the service choose one automatically. In an automatic mode, the password management service detects when a user is being prompted by a Web site to create an account (or register or input a user name and password), intercepts the user's typed password key combination, assigns a layout, generates a password, and delivers the actual password to the Web site. The service may intercept the user's typing by using a browser plug-in, a browser extension, keystroke logging technology, etc.

Because the key combination will be combined with a particular keyboard layout in order to generate the actual password, the user is restricted to only selecting those keys that would generate an actual printed character or symbol. In other words, the user should not select keys such as the "shift" key, the "control" key, the "escape" key, etc. The password management service is arranged to detect input of these non-printable keys, to ignore that input, and to only accept keys representing printable characters such as letters, numerals, symbols, etc. In one embodiment, the service prevents users from including those keys in a PKC. Instead of ignoring the non-printable keys, the password management service warns users that it is not allowed to use non-printable keys and ask for re-input of the PKC.

In some cases, the user is using a different computer and keyboard to access a particular Web site and the different keyboard has a slightly different layout making it difficult for the user to find his or her exact password key combination. This may be true if the user's PKC contains a key which exists in one keyboard (e.g., the user's computer in Europe), but does not exist in another keyboard (e.g., a computer at Internet Café in the United States). It is noted that generally every keyboard has the same primary key set within a certain area. And, the physical key layout in this area is almost always the same. One way to avoid this problem is to allow the user to use keys selected from this area only.

Figure 8:
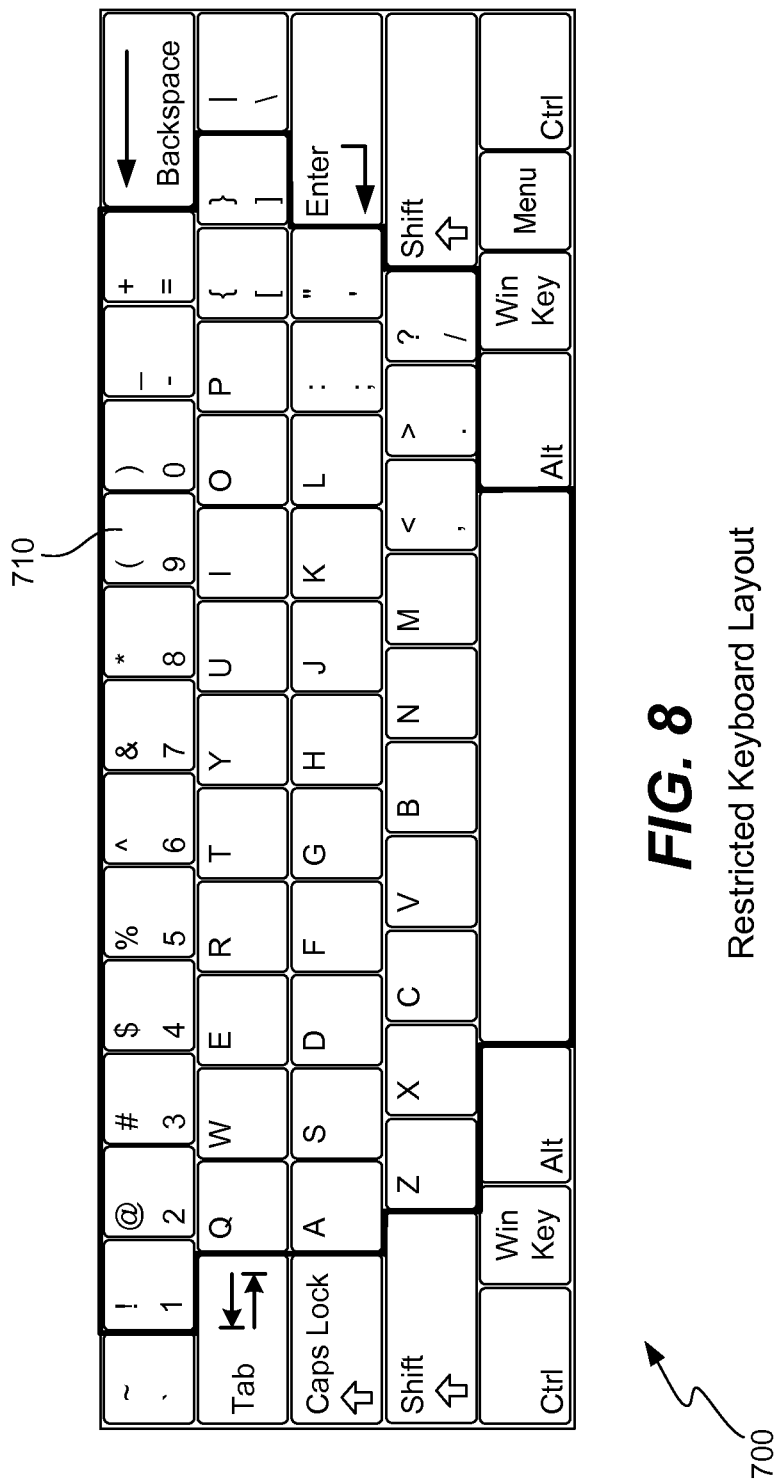
FIG. 8 shows a restricted keyboard layout.

In one embodiment, the user is restricted to a set of keys that are printing keys (that generate a visually-identifiable region) and that normally would appear in most any keyboard layout, to ensure that the user's PKC is available from most any keyboard the user should wish to use. FIG. 8 shows a restricted keyboard layout 700. Layout 700 includes a primary region 710 (bounded by a heavy line) that includes the only valid keys that a user may choose when selecting a PKC. When using this restricted keyboard layout, the service may reject any input key not in the region, may present the region 710 graphically and reject graphically any input key not in the region, may inform the user that these are the only valid keys, etc. In this fashion, the choice of a PKC is restricted to these keys. Of course, region 710 may be formed to include any selection of keys on layout 700.

In step 412 the password management service may assign a keyboard layout to the target Web site. The keyboard layout may be assigned at this time, or, the keyboard layout may be assigned when the user is logging in to the Web service as described in step 332. As mentioned above and as described in step 332, a different keyboard layout may be used for each site, the same layout may be used, or a random layout may be used for each site. Once assigned, the name of the Web site or service along with the assigned keyboard layout may be stored in a database or data structure such as Table 1.

Once the layout has been assigned, in step 416 the password management service generates a password for this target Web site using the user's PKC and the assigned keyboard layout. Optionally, the password may be generated when the user logs in for the first time (or each subsequent time) such as is described in step 336.

If the user is registering an account for the first time at the target Web site in conjunction with subscribing to the password management service, then the password management service also presents the generated password to the target Web site in order to establish the new account.

Finally, in step 420 the service updates mapping Table 1 with the name of the target Web site, the assigned keyboard layout and optionally, the generated password. Once the user has subscribed to the password management service as described above, when the user next visits the target Web site the password management service executes a login sequence as described below.

Figure 5:
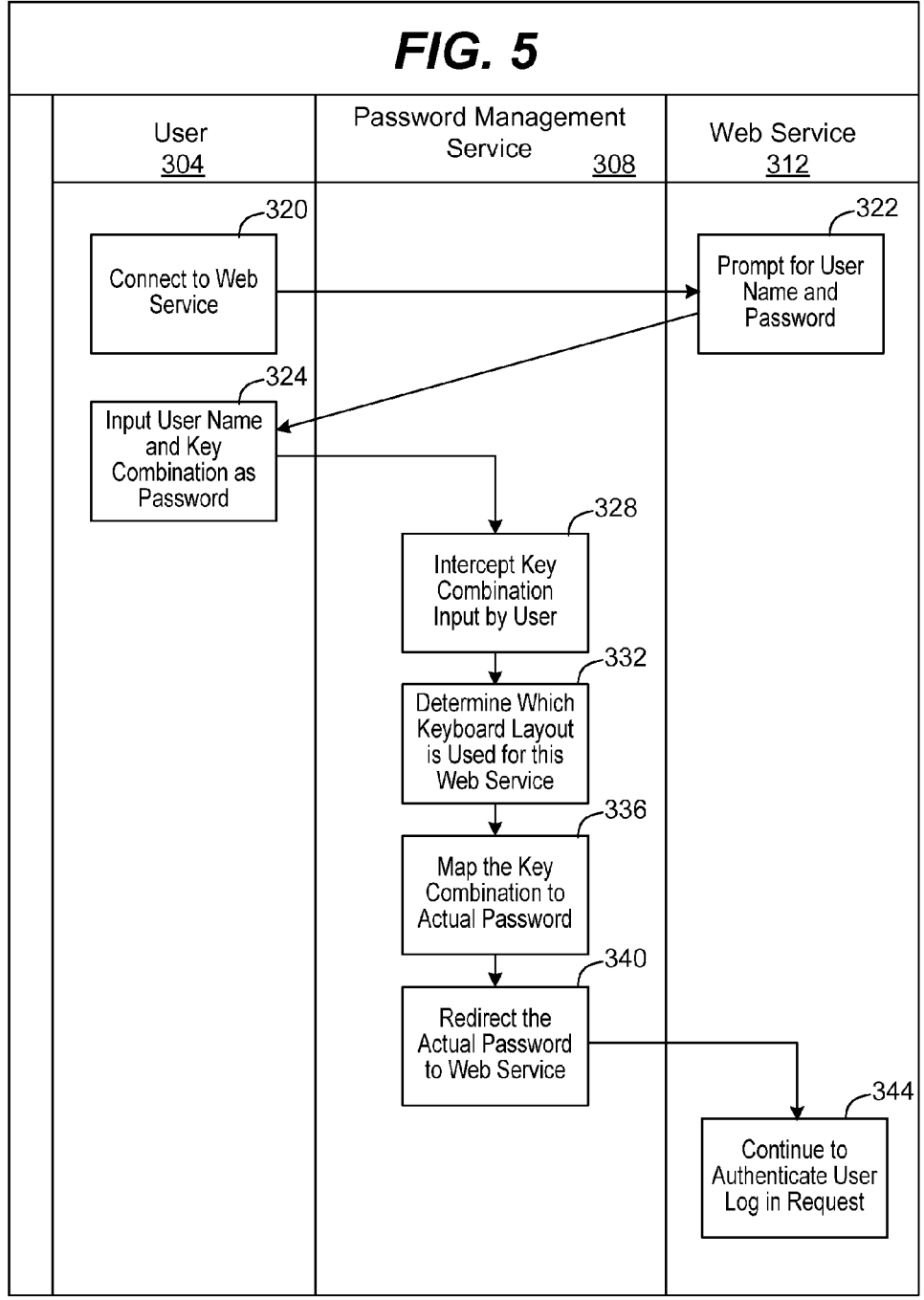
FIG. 5 is a flow diagram depicting an improved login sequence using the described password management service.

FIG. 5 is a flow diagram depicting an improved login sequence using the described password management service. This diagram includes a user 304 who is operating any suitable computing device such as a desktop computer, laptop computer, mobile telephone, tablet computer, etc., a Web service 312 which is typically an Internet Web site to which the user wishes to connect and login, and a password management service 308. The password management service is a software module located either on the user's computer device or on a computer accessible over the Internet. If located remotely from the user's device, the password management service may be located on a dedicated computer server or may be implemented by each Web service.

In step 304 the user's computing device connects to his or her Web service of choice 312 using any suitable Internet connection such as a wired connection (Ethernet, etc.), a wireless connection (using any suitable wireless protocol), and using any suitable software on the computing device such as an Internet browser. In step 322 the Web service typically will prompt the user for a user name and password by transmitting a login page back to the user's browser.

In step 324 the user inputs his or her user name into the login page and then typically hits the Return key or Tab key, at which point the user name information is sent back to the Web service. At this point, data entered by the user has been sent directly back to the Web service. But, when the user enters his or her password key combination as discussed above, this sequence of keystrokes will be intercepted by the password management service before being sent to the Web service. As shown above in examples of FIGS. 1-3, the user types any number of keys on the keyboard that represents his or her key combination, not necessarily the actual password represented by the characters labeled on each key.

In step 328 the password management service intercepts this key combination entered by the user (typically after a user hits the Return key or Tab key). The service may intercept these keystrokes as described above.

Once this key combination has been intercepted and recorded, the password management service is now ready to map this key combination to a specific keyboard layout. Accordingly, in step 332 the password management service determines which keyboard layout is to be used for this particular Web service that the user has accessed. Which keyboard layout to use may be determined in a variety of ways. In one embodiment, a single keyboard layout may be designated by the user for use with all Web services. Although this will result in the same password being used for all Web services, the user still benefits from being able to easily remember his or her password key combination and the implementation of the keyboard layout is made simpler.

In another embodiment, the user has previously designated a specific keyboard layout (such as QWERTY, Colemak, Dvorak, random, etc.) to be used with a particular Web service. Although this embodiment results in a different password being generated for each Web service, it does require a minimal amount of effort on the part of the user to choose a particular keyboard layout for each Web service that the user wishes to use. Of course, a single keyboard layout may be used for more than one Web service.

In yet another embodiment, the user does not need to designate a particular keyboard layout for each Web service, but simply directs the password management service to generate a randomly selected keyboard layout for each Web service. In this embodiment the password management service may randomly select from any of a wide variety of actual keyboard layouts (e.g., QWERTY, Colemak—layouts representing actual keyboards) and automatically choose a keyboard layout for each Web service. Preferably, the password management service chooses a unique keyboard layout for each Web service accessed by the user in order that each generated actual password will be different. It is also possible that a keyboard layout may be assigned to more than one Web service.

Or, instead of automatically choosing an actual keyboard layout, the password management service may generate a random keyboard layout each time a different Web service is accessed by the user. The password management service may generate a random keyboard layout by randomly assigning a character (i.e., letters, numbers, or symbols) to each of the keys chosen by the user as part of his or her password key combination. In this embodiment it would not be stricken necessary for the service to generate the entire keyboard layout since his random keyboard layout is not intended for use. Rather, it is sufficient only to generate random characters for each key in the password key combination. These random characters can then be saved in a graphical form such as with an actual keyboard layout, or may be saved using a simple table or other data structure which associates each key of the password key combination with the generated random character.

It should be noted that once a particular keyboard layout has been chosen or generated for a particular Web service (i.e., by using the same keyboard layout for all Web services, by allowing the user to select a particular keyboard layout for each Web service, by randomly selecting a particular keyboard layout for each Web service, or by generating random characters for the password key combination), that chosen or generated keyboard layout will always be used for that particular Web service. In this fashion, once a given Web service receives an actual password from the user for the first time (via the password management service), that Web service will continue to receive the same actual password every time the user logs in and uses the password management service. Therefore, step 332 not only determines a keyboard layout to be used for the first time by a particular Web service, but also ensures that any second and subsequent times that a Web service is accessed that the same keyboard layout will be used.

In one embodiment, the password management service determines which keyboard layout to use for a particular Web service by referencing a table as shown at Table 1, for example. Of course, other data structures may also be used. The service has previously saved this information in step 420, for example.

TABLE 1

| Keyboard Layout Mapping Table | |
|---|---|
| Web site or Web Service | Keyboard Layout |
| www.facebook.com | Layout 1 |
| www.twitter.com | Layout 2 |
| www.plurk.com | Layout 3 |

Once the correct keyboard layout has been determined for the Web service 312 to be accessed, in step 336 the password key combination input by the user in step 324 is mapped to this determined keyboard layout in order to generate the actual password. For example, FIG. 3 shows a password key combination 220-227 that has been mapped to the keyboard layout 210 resulting in the actual password "1QAZ3FSC." Once the actual password has been determined, then in step 340 the password management service redirects this actual password back to the Web service 312. At this point in time the password management service has completed its interception routine and is no longer involved in the communication between the user 304 and the Web service 312.

In step 344 the Web service 312 receives the actual password from the password management service and continues its authentication of the user. As known in the art, if this is the first login attempt by the user (i.e., the user is setting up an account) then the actual password is checked to make sure it is strong enough, and if so, the password is logged by the Web service and the user is allowed to set up an account and use the Web service. If this is a subsequent login attempt by the user, the actual password is compared to the password on record and the user is authenticated if the passwords match.

Implementation Embodiments

The present invention may be implemented in any suitable fashion. For example, the password management service may be implemented as an application on the end-user's computer, on the end-user's mobile device, or may be located "in the cloud" and accessed over the Internet using a client agent.

Figure 6:
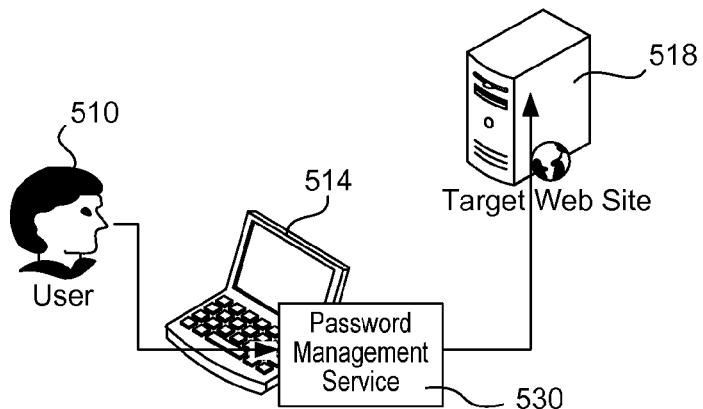
FIG. 6 illustrates a system for implementing an embodiment of the invention.

FIG. 6 illustrates a system 504 for implementing an embodiment of the invention. Included is an end-user computer 514 operated by user 510, a target Web site located on a remote server computer 518 (accessed over the Internet), and a password management software module 530 located on the end-user computer. In this embodiment the password management service is software installed on the end-user computer and it uses local storage such as a file, disk or database to store the keyboard layout mapping table. The software is then able to intercept a user's login attempt and process the user's PKC before submitting the generated password to the target Web site.

Figure 7:
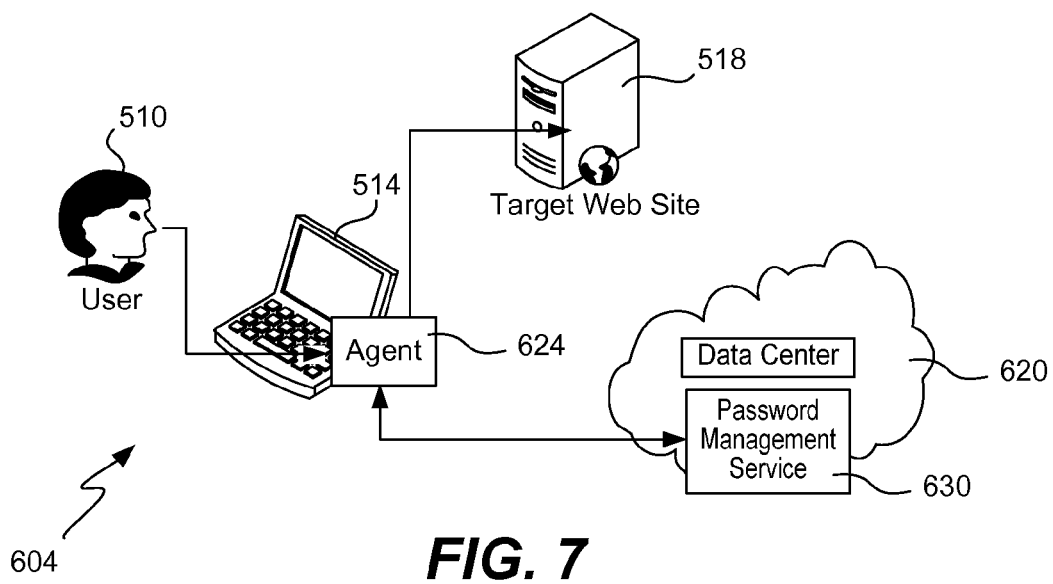
FIG. 7 illustrates a system for implementing another embodiment of the invention.

FIG. 7 illustrates a system 604 for implementing another embodiment of the invention. Included is an end-user computer 514 operated by user 510, a target Web site located on a remote server computer 518 (accessed over the Internet), a password management software module 630 located in a data center 620 accessed over the Internet, and agent software 624 located on the end-user computer. In this embodiment the password management service is software installed on a computer in the remote data center and it uses agent 624 to intercept the user's login attempt and pass the user's PKC to the password management service at the data center. The password management service may be located in a company data center or in a service provider's data center, and uses suitable storage of the data center to store the keyboard layout mapping table. The password management service then provides the mapping, generates the actual password, and returns this password to the agent so that it may be provided to the target site 518.

In a variation on the embodiment shown in FIG. 7, the password management service 630 may be accessed and used by any number of users at the same time, each user having agent software on his or her local computer. In this embodiment, each user has an account with the password management service, and there exists a mapping table in the data center for each user. For example, Tables 2 and 3 illustrate how numerous mapping tables may exist in the service, each mapping table being identified for use by a particular user. The user sends their identifier along with the Web site and PKC when accessing the password management service.

TABLE 2

Mapping Table for User One

| User:<br>Web site or Web Service | JoeSmith@company.com<br>Keyboard Layout |
|---|---|
| www.linkedin.com | Layout 4 |
| www.cnn.com | Layout 5 |
| www.npr.com | Layout 6 |

TABLE 3

Mapping Table for User Two

| User:<br>Web site or Web Service | FredSmith@company.com<br>Keyboard Layout |
|---|---|
| www.plaxo.com | Layout 7 |
| www.delta.com | Layout 8 |
| www.nytimes.com | Layout 9 |

In one specific implementation, the invention is able to enforce password constraints imposed by various Web sites. For example, the password management service maintains a list, table or data structure such as that shown in Table 4. The service builds and maintains this list to keep track of any number of Web sites or Web services and the password constraints that each Web site or Web service imposes. A given site may impose more than one constraint. In a first specific implementation, the password management service reviews the generated password for a particular site, and, if the generated password does not meet the constraint, then the service adds in the required character (such as always at the beginning or always at the end). For example, if a site requires at least one capital letter and the generated password does not have a capital letter, then the service may add the capital letter "S" to the end of the generated password. In a second specific implementation, the password management service reviews the generated password for a particular site, and, if the generated password does not meet the constraint, then the service requires the user to retype a new password key combination that would include the required character. For example, if a site requires at least one number and the generated password does not have a number, then the service prompt the user to retype the password key combination with a suggestion that the combination must include a number. In a third specific implementation, the password management service reviews the generated password for a particular site, and, if the generated password does not meet the constraint, then the service chooses a different keyboard layout that will result in a generated password that meets the constraint. For example, if a site requires at least one symbol and the generated password does not have a symbol, then the service selects a different keyboard layout having the key "=" that falls within the user's password key combination.

Is a site constraint requires at least 8 characters, for example, then the password management service, upon review of the generated password, may add in extra characters to the end of password, or may prompt the user to retype the password with a suggestion that more characters are needed. The password management service consistently applies one of these techniques to remedy the deficient password and satisfy the constraint such that the same password is always generated for a particular Web site.

TABLE 4

List of Password Constraints

| Web Site | Password Constraint |
|---|---|
| www.cnn.com | at least one capital letter |
| www.plaxo.com | at least one number |
| www.delta.com | at least one symbol |
| www.nytimes.com | length of at least 8 |

In one particular implementation it is possible to generate a password that would include one of the symbols found above any of the numerals in the top row of the keyboard. For example, it is possible to include the symbol "&" in a generated password which normally requires the "shift" key and the "7" to be pressed at the same time. Since each keystroke maps to a single character, the service using one layout maps the key '7' to the digit '7' and in another layout maps the key '7' to the symbol '&'. If the generated password must have a '&' (due to the Web site's password constraint) we explicitly make one key in the user's PKC map to the character '&'. In other words, the service crafts a keyboard layout which fulfills the Web site's password constraint.

Computer System Embodiment

Figure 9:
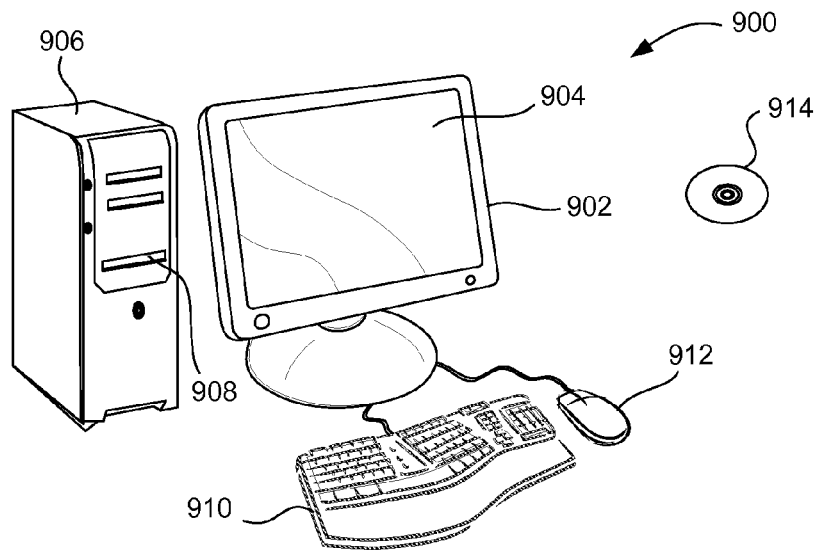
FIGS. 9 and 10 illustrate a computer system suitable for implementing embodiments of the present invention.
Figure 10:
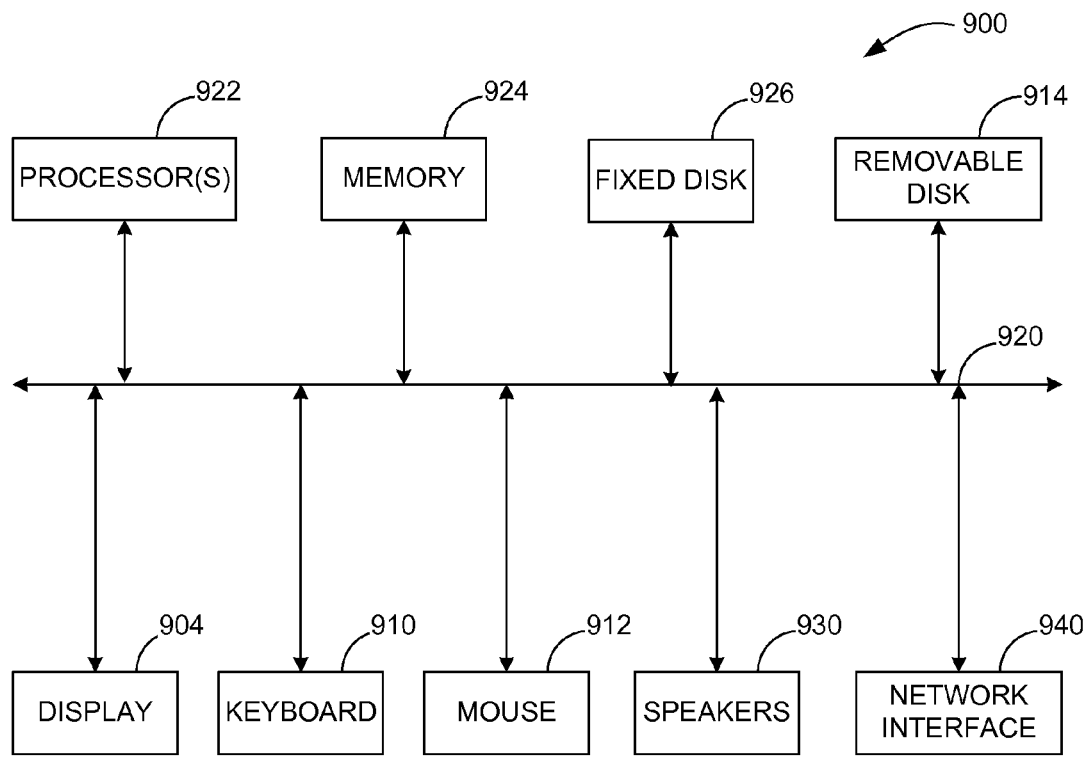

FIGS. 9 and 10 illustrate a computer system 900 suitable for implementing embodiments of the present invention. FIG. 9 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating a password, said method comprising:
   receiving an identifier that identifies a Web service from a user computing device;
   receiving a key combination representing a sequence of physical keys found on a keyboard of said user computing device;
   accessing a database using said Web service identifier as an index and retrieving a keyboard layout associated with said Web service, said keyboard layout associating a character with each key of said keyboard layout;
   mapping said key combination onto said keyboard layout to generate a sequence of said characters; and
   returning said sequence of said characters to said user computing device for use as said password.

2. A method as recited in claim 1 wherein said database includes a plurality of web service identifier/keyboard layout pairs, and wherein said keyboard layouts are different.

3. A method as recited in claim 1 further comprising:
   accessing said Web service online by said user computing device and displaying a password input field of said Web service on said user computing device;
   receiving said key combination by intercepting said user's keystrokes when entering a password combination for said Web service; and
   returning said sequence of said characters by redirecting said sequence to said password input field of said Web service.

4. A method as recited in claim 1 wherein said keyboard layout does not represent a functional keyboard to be used for typing.

5. A method as recited in claim 1 further comprising:
   producing each character of said keyboard layout by using a function that randomly assigns a character to said each key of said keyboard layout.

6. A method as recited in claim 1 wherein said keyboard is a virtual keyboard.

7. A method as recited in claim 1 wherein said user computing device is a laptop computer, a desktop computer, a mobile telephone or a tablet computer.

8. A method of generating a password, said method comprising:
- receiving in an agent software module of a user computing device an identifier that identifies a Web service;
- receiving in said agent software module of said user computing device a key combination representing a sequence of physical keys found on a keyboard of said user computing device;
- sending, from said agent software module, said Web service identifier and said key combination over a network to a password management service;
- receiving from said password management service at said agent software module a sequence of characters, said sequence resulting from a function unique to said Web service identifier being applied to said key combination;
- returning said sequence of said characters to said user computing device for use as said password.

9. A method as recited in claim 8 wherein said characters only include printable numerals, letters or symbols.

10. A method as recited in claim 8 further comprising:
- accessing said Web service online by said user computing device and displaying a password input field of said Web service on said user computing device;
- receiving said key combination by intercepting said user's keystrokes when entering a password combination for said Web service; and
- returning said sequence of said characters by redirecting said sequence to said password input field of said Web service.

11. A method as recited in claim 8 further comprising:
- sending, along with said Web service identifier and said key combination, a user identifier, wherein said function is dependent upon said user identifier.

12. A method as recited in claim 8 wherein said user computing device does not include physical keys and wherein said keyboard is a virtual keyboard.

13. A method of generating a password, said method comprising:
- receiving in an agent software module of a user computing device an identifier that identifies a Web service;
- receiving in said agent software module of said user computing device a key combination representing a sequence of physical keys found on a keyboard of said user computing device, said key combination being restricted to a set of keys found in a primary region of said keyboard;
- sending, from said agent software module, said Web service identifier and said key combination over a network to a password management service;
- receiving from said password management service at said agent software module a sequence of characters, said sequence resulting from a function unique to said Web service identifier being applied to said key combination;
- returning said sequence of said characters to said user computing device for use as said password.

14. A method as recited in claim 13 wherein said set of keys in said primary region only includes printable numerals, letters, or symbols.

15. A method as recited in claim 1 further comprising:
- restricting said key combination to only include printable numerals, letters, or symbols.

16. A method as recited in claim 1 further comprising:
- restricting said key combination to a set of keys found in a primary region of said keyboard.

17. A method of generating a password, said method comprising:
- receiving an identifier that identifies a Web service from a user computing device;
- accessing said Web service online by said user computing device and displaying a password input field of said Web service on said user computing device for entering said password;
- receiving a key combination by intercepting a user's keystrokes when entering a password combination for said Web service, said key combination representing a sequence of physical keys found on a keyboard of said user computing device;
- selecting a keyboard layout that associates a character with each key of said keyboard layout;
- mapping said key combination onto said keyboard layout to generate a sequence of said characters; and
- returning said sequence of said characters for use as said password by redirecting said sequence to said password input field of said Web service.

18. A method of generating a password, said method comprising:
- receiving an identifier that identifies a Web service from a user computing device;
- receiving a key combination representing a sequence of physical keys found on a keyboard of said user computing device;
- using said Web service identifier, selecting a keyboard layout that associates a character with each key of said keyboard layout, each character of said keyboard layout being produced by generating a random character for each key of said keyboard layout;
- mapping said key combination onto said keyboard layout to generate a sequence of said characters; and
- returning said sequence of said characters to said user computing device for use as said password.

19. A method of generating a password, said method comprising:
- receiving an identifier that identifies a Web service from a user computing device;
- saving said Web service identifier and an identifier identifying a selected keyboard layout in association in a data structure;
- receiving a key combination representing a sequence of physical keys found on a keyboard of said user computing device;
- selecting said keyboard layout by using said Web service identifier as an index into said data structure, said keyboard layout associating a character with each key of said keyboard layout;
- mapping said key combination onto said keyboard layout to generate a sequence of said characters; and
- returning said sequence of said characters to said user computing device for use as said password.

20. A method of generating a password, said method comprising:
- receiving an identifier that identifies a Web service from a user computing device;
- receiving a key combination representing a sequence of physical keys found on a keyboard of said user computing device;
- selecting a keyboard layout that associates a character with each key of said keyboard layout;
- mapping said key combination onto said keyboard layout to generate a sequence of said characters;
- determining that said sequence of said characters does not meet a password constraint of said Web service by reference to a table that includes said Web service identifier and said corresponding password constraint;

automatically adding a character to said sequence of characters to produce a modified sequence of characters without user input, whereby said modified sequence satisfies said password constraint; and returning said modified sequence of said characters to said user computing device for use as said password.

21. A method of generating a password, said method comprising:

receiving an identifier that identifies a Web service from a user computing device;

receiving a key combination representing a sequence of physical keys found on a keyboard of said user computing device;

selecting a keyboard layout that associates a character with each key of said keyboard layout;

mapping said key combination onto said keyboard layout to generate a sequence of said characters;

determining that said sequence of said characters does not meet a password constraint of said Web service;

selecting a second keyboard layout that maps said key combination onto a second sequence of characters that does meet said password constraint of said Web service; and returning said second sequence of said characters to said user computing device for use as said password.

22. A method of generating a password, said method comprising:

receiving an identifier that identifies a Web service from a user computing device;

receiving a key combination representing a sequence of physical keys found on a keyboard of said user computing device;

restricting said key combination to a set of keys found in a primary region of said keyboard;

selecting a keyboard layout that associates a character with each key of said keyboard layout;

mapping said key combination onto said keyboard layout to generate a sequence of said characters;

returning said sequence of said characters to said user computing device for use as said password.

23. A method as recited in claim 22 further comprising:

further restricting said key combination to only include printable numerals, letters, or symbols.

* * * * *